Nov. 6, 1962 C. B. GRADY, JR 3,063,008

FAST CHARGING ELECTRICAL LEAKAGE MEASURING NETWORK

Filed Dec. 29, 1960

INVENTOR
Charles B. Grady Jr.

3,063,008
FAST CHARGING ELECTRICAL LEAKAGE MEASURING NETWORK
Charles B. Grady, Jr., 1 Ridgeway Ave., West Orange, N.J.
Filed Dec. 29, 1960, Ser. No. 88,240
1 Claim. (Cl. 324—60)

This invention relates to an improved apparatus for rapidly measuring the high shunt electrical resistive leakage of capacitors or circuits having distributed capacitance.

The present state of the art relating to such measurements suffers from the time required for the measuring current to approach its asymptotic equilibrium value sufficiently closely to constitute a reasonably accurate reading. This time constant, due to the large product of capacitance and unknown leakage resistance, is present whether the capacitor is pre-charged to a fixed high voltage and allowed to discharge down to the equilibrium potential, or whether the asymptote is approached by the charging potential. The foregoing time of measurement is particularly objectionable in the production testing of capacitors.

The present invention overcomes these difficulties by providing a novel network which automatically charges the capacitor under test to a high potential at a high rate until it is within a few predetermined volts of its unknown equilibrium potential and which then, at a lower rate, seeks its final measuring value, thereby greatly speeding up the overall test time.

This two stage charging is accomplished in my invention by a three loop-network. In the first loop a high potential current source, a rectifying diode for passing the high potential current, a low potential current source of opposing polarity to the first current source, and the capacitor under test with its shunt leakage, are all connected in series.

This first loop rapidly charges the capacitor under test to a potential equal to the difference between the foregoing high and low opposing potentials at a rate limited only by the internal resistances of the current sources and the forward resistance of the diode. Thereafter, no further current (other than diode leakage) passes through either the diode or the low potential source of this loop.

The second loop includes in series, the foregoing low potential current source and diode, together with a load resistor small in comparison to the leakage resistances to be measured. It is this load resistor which completes the last few volts of test capacitor charging from the high potential source to its equilibrium potential.

The third loop is simply a high impedance volt meter for measuring the final leakage-current voltage drop in parallel with the foregoing load resistor.

In the preferred form of my device, the foregoing high potential current source and the high impedance voltmeter amplifying circuit are both transistorized. Consequently, the clamping action of the diode and low potential (battery) current source acting across the load resistor and parallel volt-meter circuit, serves the additional valuable purpose of protecting the transistors of the voltmeter circuit from the destructive breakdown which exposure to the high voltage charging potential would otherwise produce.

An object of this invention is to provide the means for rapidly measuring the insulation resistance of capacitors or of circuits with distributed capacitance.

A second object is to provide a transistorized circuit for applying high potentials for test purposes to electrical components which will protect its transistors from damage by the high voltage.

A third object is to provide a bridge circuit for measuring unknown resistances in which the change of voltage, across one leg can never exceed a predetermined value regardless of the resistance change in the unknown by other objects are implicit in the accompanying specifications and claims.

Figure 3:
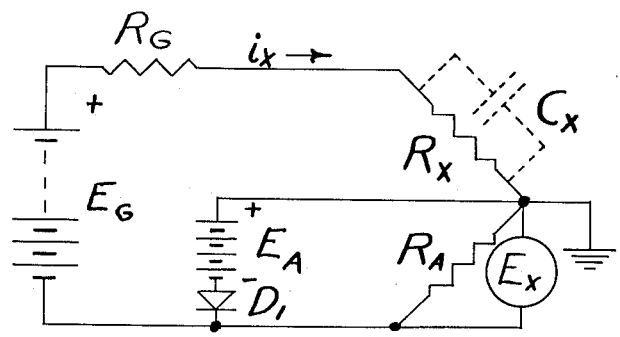
FIG. 3 is the basic schematic diagram of the network taught by my invention.

In FIG. 3 it may be seen that the circuit consists of a three loop network. The first loop includes in series relation the low potential current source $E_A$, the rectifying diode $D_1$ having a polarity opposing $E_A$, the high potential current source $E_G$ with a polarity opposing $E_A$, a resistance $R_G$ representing the internal resistance of $E_G$, and the impedance under test connected between the terminals $X_1$ and $X_2$, shown as a capacitor $C_x$ shunted by its leakage resistance $R_x$.

Source $E_A$ is preferably a battery, and is considered to have negligible internal resistance as compared to the other components.

The second loop shares with the first loop battery $E_A$ and diode $D_1$ and has in addition, the load resistor $R_A$, to complete its series circuit.

The third current loop of the network comprises a high impedance voltmeter $E_x$ connected in parallel with the load resistor $R_A$ of loop two.

The operation of this circuit is as follows:

Before the test capacitor and its leakage path are connected across terminals $X_1X_2$, negligible current will flow through $R_A$, and volt meter $E_x$ will read close to zero since $D_1$ opposes $E_A$ and is presumed to have negligible leakage.

When $C_x$ and $R_x$ are connected across $X_1$ and $X_2$, the high potential of $E_G$ will overcome the low opposing potential of $E_A$ and will charge capacitor $C_x$ through diode $D_1$ at a rate limited only by the internal resistance $R_G$ of the high voltage source, and the relatively negligible forward resistance of $D_1$ and distributed inductions of the circuit. The corresponding rise of potential $E_c$, across $C_x$ is shown in FIG. 1 as the steep exponential rise between $t_0$ and $t_1$.

When $E_C$ has reached the value $(E_G - E_A)$ the charging current through $E_A$ and $D_1$ will cease since there is no longer a forward difference of potential across the diode. However, the load resistor $R_A$, which from $t_0$ to $t_1$ had been supplying a small parallel fraction of the charging current, now continues to charge $C_x$ at a slower rate as seen in the discontinuity of the slope of $E_C$ at $t_1$ in FIG. 1.

Figure 1:
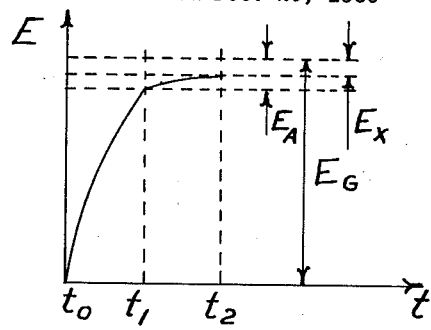
FIG. 1 is a graphical diagram showing the potential $E_c$ across a capacitor under test by the circuit of FIG. 3, as a function of time.

This slower charging continues until the leakage current $i_x$ asymtotically produces a voltage drop across the three series resistances $R_x$, $R_A$, and $R_G$ equal to $E_G$ as shown at $t_2$ of FIG. 1. At this point the potential $E_x$ (equal to $i_xR_A$) will be read by the voltmeter, and since this value is inversely proportional to $R_x$ the meter can be directly calibrated in leakage megohms.

If the leakage resistance $R_x$ were very low such as that due to a short circuit, the terminal $X_2$ would tend to rise to the high voltage potential with resultant damage to the meter $E_x$. However, as soon as the potential at $X_2$ relative to ground rises above the fixed low battery potential $E_A$, current will flow through diode $D_1$, thereby short circuiting any further rise of potential across $R_A$. Under these circumstances the current would be limited by $R_G$, which should be so designed as to be able to limit this short circuit current without damage to the instrument.

If $R_x$ is infinite, no current $i_x$ will flow after the condenser is charged to $E_G$, and the meter will read zero, if $D_1$, has no leakage.

Figure 2:
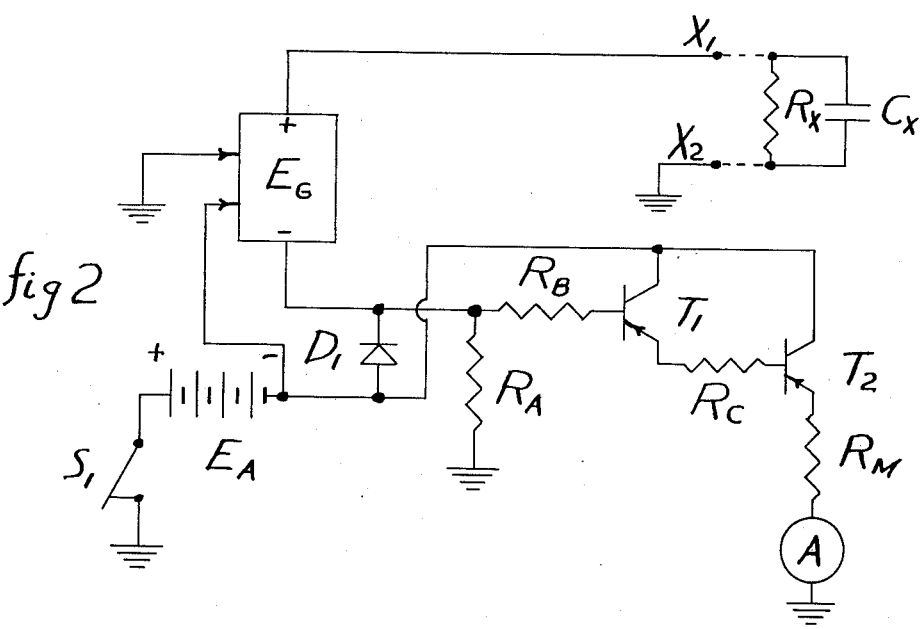
FIG. 2 is the schematic diagram of the preferred embodiment of the network of FIG. 3.

The preferred embodiment of FIG. 2 conforms to the basic circuit of FIG. 3 but shows, in place of meter $E_X$, a transistor amplifier $T_1$ and emitter follower $T_2$ driving a milliammeter A.

The same battery $E_A$ used as a clamping reference in FIG. 3, is used in the circuit of FIG. 2 as the power source not only for $T_1$ and $T_2$ but also for a transistorized D.C. to D.C. (multivibrator-transformer-voltage doubler-rectifier) current source $E_G$. This permits the instrument to be packaged as a compact portable unit having a single battery supply.

Switch $S_1$, energizes the entire system. Resistors $R_B$ and $R_C$ are protective resistors for the PNP transistors $T_1$ and $T_2$. $R_M$ represents the internal resistance of the meter A. Typical values used in equipments embodying FIG. 2 are $E_G$=500 volts; $E_A$=6 volts; $R_A$=1.5 megohms; $R_M$=5000 ohms.

In operation, the absence of leakage current $i_X$ through load resistor $R_A$ holds the base of $T_1$ positive thereby cutting it off, and, by the resultant absence of current in the base of $T_2$ it is cut off leaving meter A at zero indication.

As the leakage resistance decreases $i_X$ increases and the drop across $R_A$ draws the base of $T_1$ more negative allowing more and more current to flow in both $T_1$ and $T_2$ and similarly in meter A. The circuit parameters are chosen so that when the base of $T_1$ is made fully negative to the clamping potential $E_A$, the meter will read full scale.

What I claim is:

In a circuit for the measurement of the resistive components of an impedance, the combination comprising: a source of high potential current; a diode; a source of low potential current; first circuit means to connect in series relation said high potential source, said diode, said low potential source, and said impedance; the polarity of said low potential source being such as to oppose both said high potential source and the conductive polarity of said diode; a load resistor; second circuit means to connect in series relation said low potential source, said diode, and said load resistor; a high impedance voltmeter; and third circuit means to connect in series relation said load resistor and said voltmeter.

References Cited in the file of this patent

UNITED STATES PATENTS

| | | |
|---|---|---|
| 2,031,840 | McCarty | Feb. 25, 1936 |
| 2,121,725 | Baumzweiger | June 21, 1938 |